Dec. 3, 1957   O. J. BORROWDALE   2,815,134
DEVICE FOR FACILITATING THE UNLOADING OF HOPPERS
Filed July 9, 1953   5 Sheets-Sheet 1
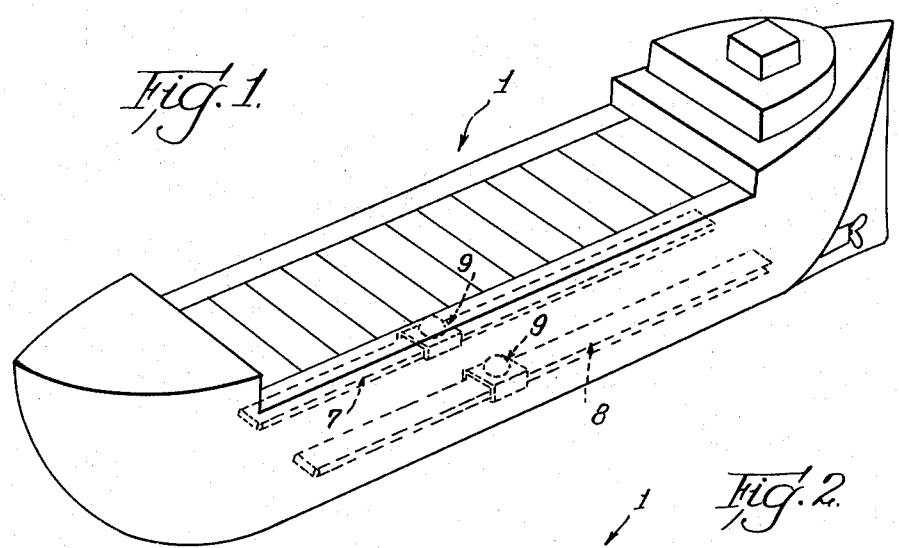
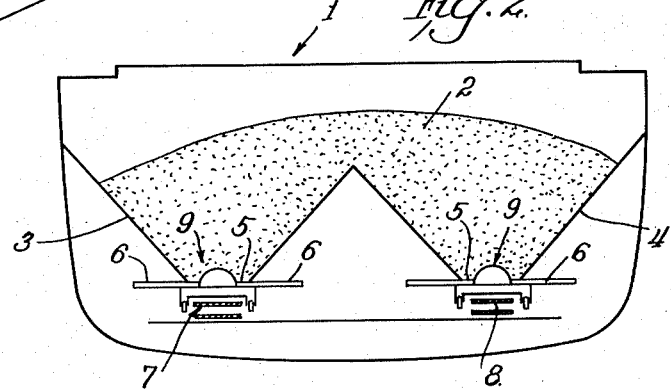
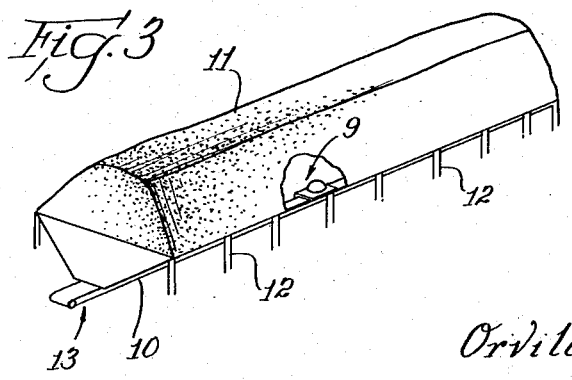
INVENTOR.
Orville J. Borrowdale
BY
Gary, Desmond & Parker
Attys Dec. 3, 1957   O. J. BORROWDALE   2,815,134
DEVICE FOR FACILITATING THE UNLOADING OF HOPPERS
Filed July 9, 1953   5 Sheets-Sheet 2
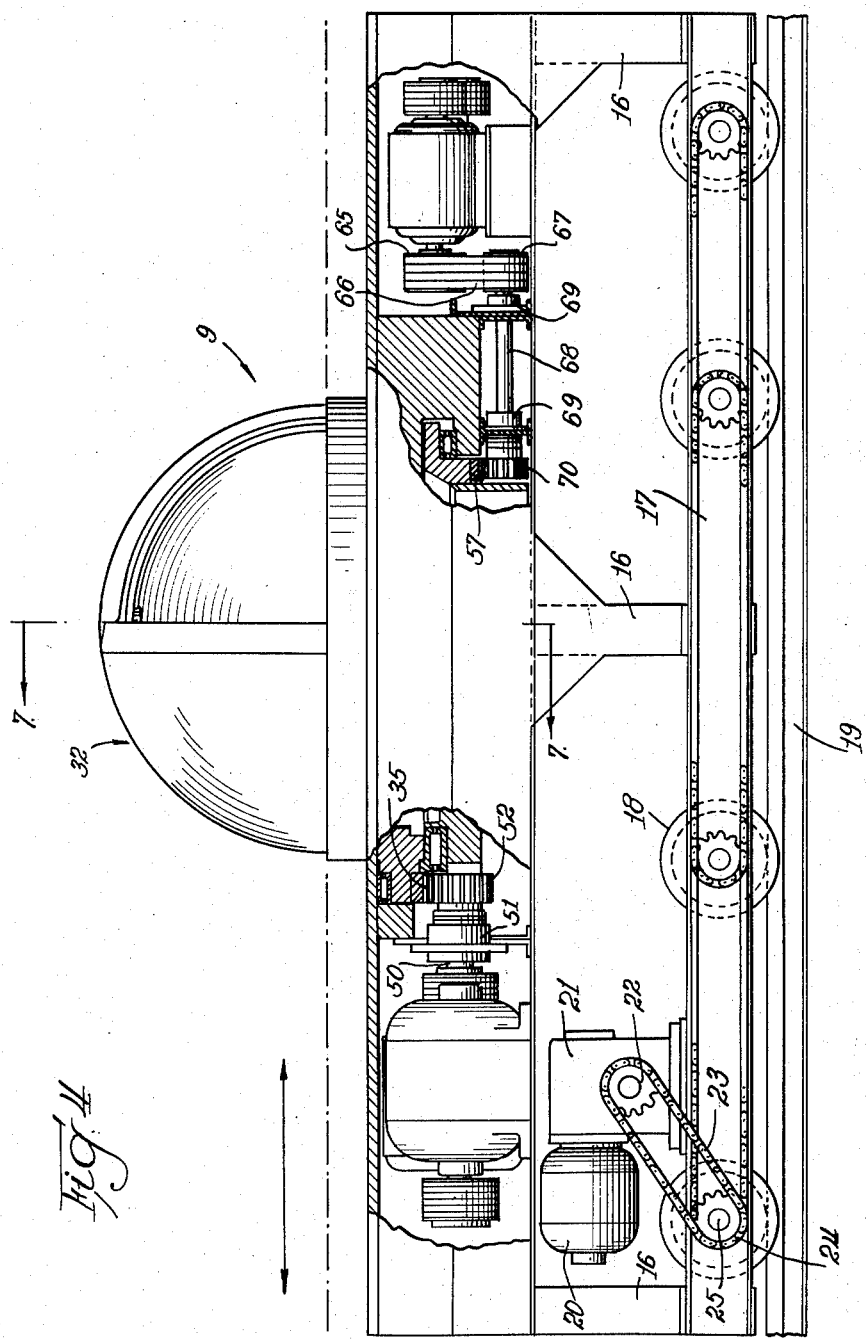
INVENTOR.
Orville J. Borrowdale
BY
Gary, Desmond & Parker.
Att'ys Dec. 3, 1957  O. J. BORROWDALE  2,815,134
DEVICE FOR FACILITATING THE UNLOADING OF HOPPERS
Filed July 9, 1953  5 Sheets-Sheet 3

INVENTOR.
Orville J. Borrowdale
BY
Gary, Desmond & Parker
Att'ys.

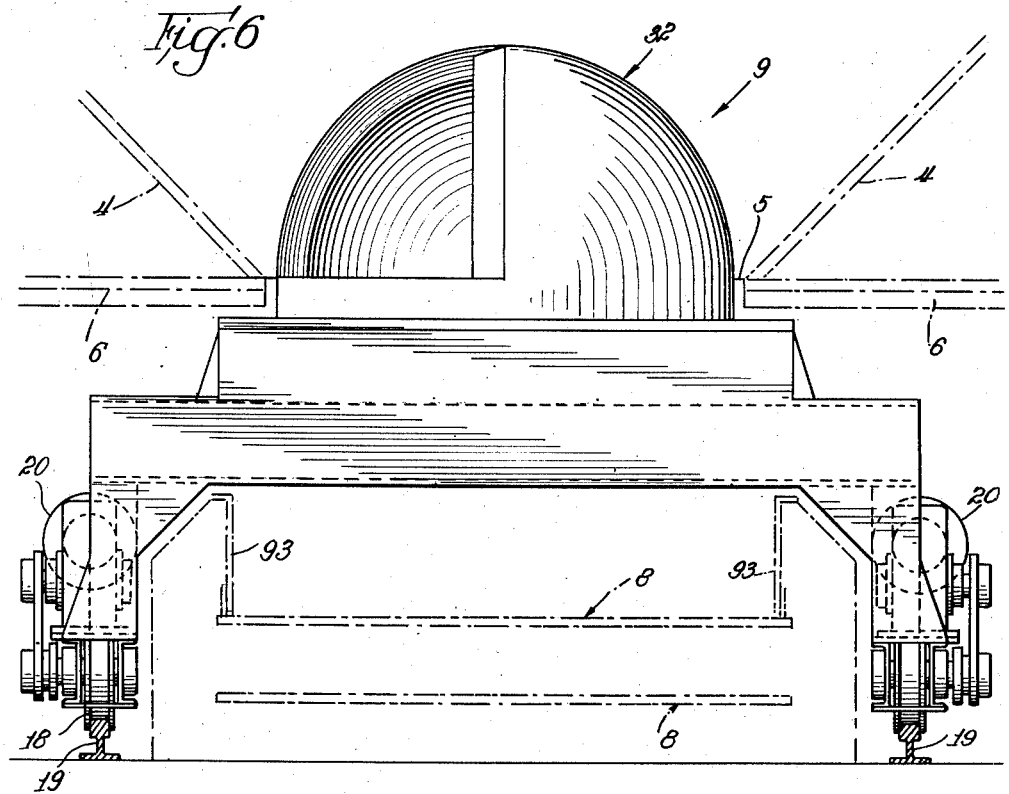
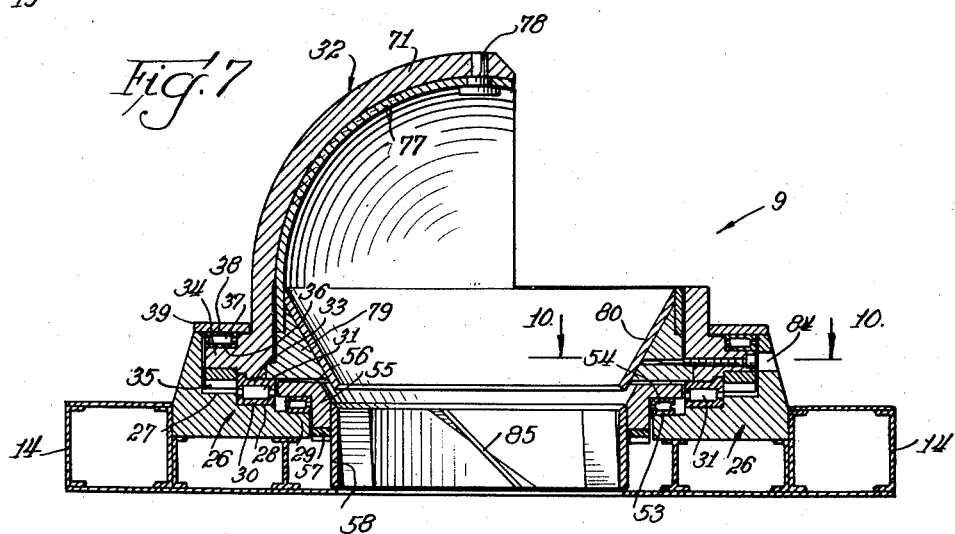

Dec. 3, 1957      O. J. BORROWDALE      2,815,134
DEVICE FOR FACILITATING THE UNLOADING OF HOPPERS
Filed July 9, 1953      5 Sheets-Sheet 5
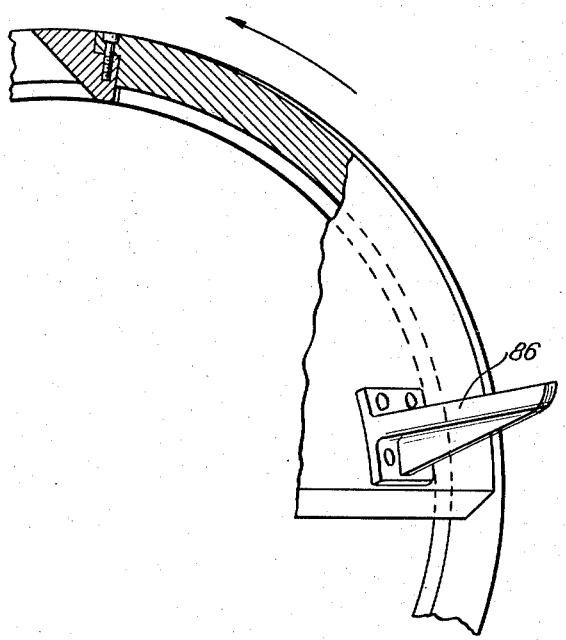
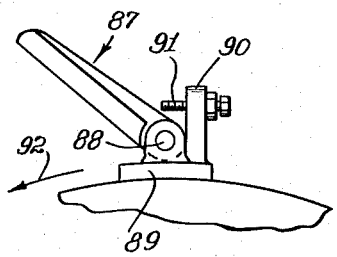
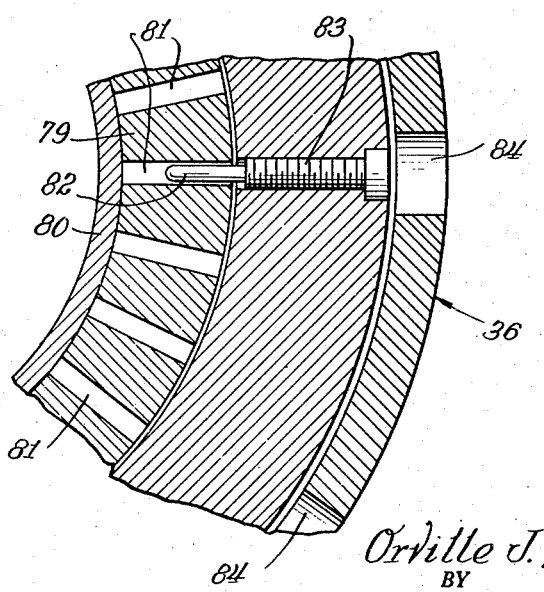
INVENTOR.
Orville J. Borrowdale
BY
Gary, Desmond & Parker
Attys.

United States Patent Office 2,815,134
Patented Dec. 3, 1957

2,815,134
DEVICE FOR FACILITATING THE UNLOADING OF HOPPERS

Orville J. Borrowdale, Chicago, Ill.

Application July 9, 1953, Serial No. 366,952

13 Claims. (Cl. 214—17)

This invention relates to improvements in an apparatus for unloading hoppers and refers particularly to a device for directing and controlling the flow of granular, discrete or lumpy material from the bottom of a hopper.

In the transportation by ship of such materials as ore, coal, sand, gravel and the like and in the storage of such materials, elongated hoppers are frequently employed. In general, the hoppers used are roughly prism-shaped, that is, they are usually of approximately triangular cross-section. To unload such hoppers it is of advantage to unload them from the bottom whereby the unloading can be essentially accomplished by gravity. As an idea way of unloading the hoppers, an endless conveyor belt is disposed beneath the hopper, and gates may be provided at the hopper bottom which may be opened to permit the material to flow from the hopper onto the conveyor, and the conveyor, continuously moving, carries the unloaded material to a desired destination.

In unloading hoppers in the fashion described hereinbefore, a number of difficulties are encountered. One of the difficulties met with resides in the fact that the conveyor belt moves at a constant rate whereas it is most difficult to control the rate of flow of the material from the hopper to uniformloy load the belt. That is, at times the material may flow so freely from the hopper as to overload portions of the belt and the material spills over the sides of the belt whereas, at other times the flow of the material is so slow from the hopper that portions of the belt are underloaded. Another difficulty, which is characteristic of the material handled is that some materials pack or cohere, particularly at the lower portion of the hopper, to such an extent that they will not flow from the hopper. This is particularly true of relatively fine materials which may be wet which tend to adhere and cohere within the hopper.

The present invention is directed to an apparatus intended to induce, direct and control the flow of materials from a hopper whereby a more or less uniform loading of a continuously uniformly moving conveyor may be secured.

One of the features of the invention resides in an apparatus which may travel beneath a hopper and extend upwardly into the material in the hopper through the hopper bottom, the device being rotated whereby the material in the hopper is agitated so as to break any adhering or cohering condition which may exist and whereby the material is conditioned for gravity flow from the hopper.

Another important feature of the invention resides in means for controlling the rate of flow of the material from the hopper to the belt.

Other objects and features of the invention will be apparent from the accompanying drawings and following detailed description.

In the drawings,

Fig. 1 is a perspective view of a cargo-carrying ship equipped with my improved hopper unloader, shown diagrammatically.

Fig. 2 is a cross-section taken through the ship illustrated in Fig. 1.

Fig. 3 is a diagrammatic perspective view of a filled storage hopper wherein my invention may be employed.

Fig. 4 is a side elevational view, parts being broken away and parts being shown in section of my improved hopper unloader.

Fig. 6 is an end view of the device shown in Figs. 4 and 5.

Fig. 7 is a detailed sectional view taken on line 7—7 of Fig. 4.

Fig. 8 is a fragmentary detailed view of a modified form of agitating dome which may be employed in my device, the dome surface carrying a fixed agitating spur.

Fig. 9 is a detailed view of a modified form of spur which may be employed.

Fig. 10 is an enlarged detailed sectional view of the locking means for the dome-opening control member employed in the device.

Figure 5:
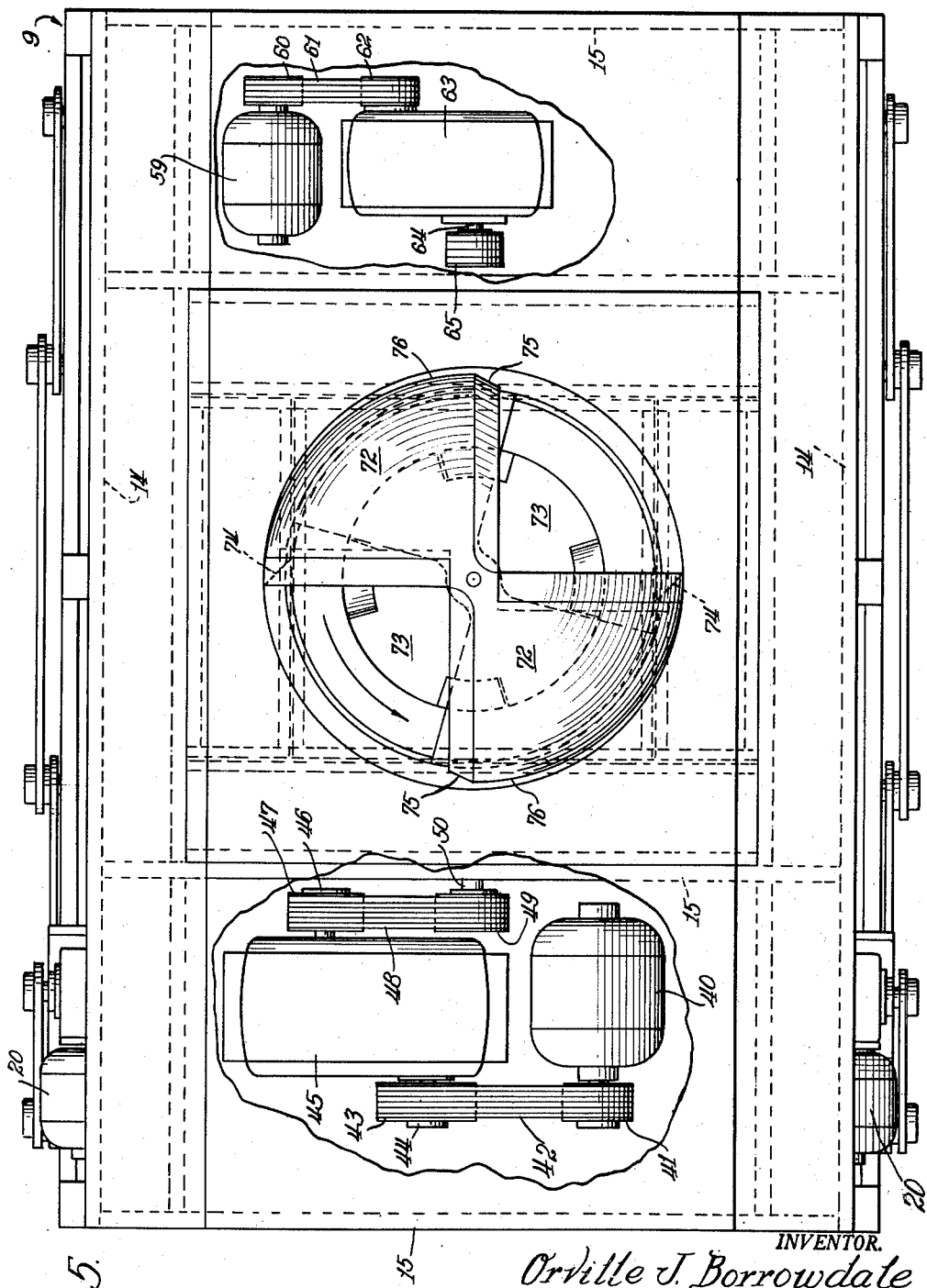
Fig. 5 is a top plan view of the apparatus shown in Fig. 4, parts being broken away.

Referring in detail to the drawings, 1 indicates a cargo-carrying ship which, for carrying cargo 2 may have double, relatively elongated hoppers 3 and 4. Each of the single hoppers may be substantially triangular in cross-section and may be provided at its bottom with an elongated discharge 5 which may be closed by a plurality of transversely sliding gates 6 which may be separately opened along the lengths of the discharges to permit removal of the cargo 2. Beneath the elongated discharges 5 conveyors 7 and 8 may be positioned, said conveyors comprising endless conveyor belts which may extend longitudinally beneath the discharges. The material removed from the hoppers and carried by the conveyors may be carried to either end of the ship whereat said material may be elevated from the ship by any suitable elevating means (not shown).

Beneath each hopper discharge 5 and above the conveyors 7 and 8 hopper unloaders 9 may be positioned. As will be hereinafter more fully described, the hopper unloaders 9 are movable lengthwise of the conveyors 7 and 8 and discharges 5 and facilitate the unloading of the hoppers and the efficient loading of the conveyors.

In Figs. 1 and 2, one use of my present invention is illustrated, but it is to be understood that it may be usesd effectively in other environments. For example, as shown in Fig. 3, an elongated storage hopper 10 may be employed to hold coal 11 or the like in a storage yard. The hopper 10 may be supported by suitable supporting means 12 and an endless conveyor 13 may be positioned beneath the hopper discharge (not shown) which may be relatively elongated, being coextensive with the length of the hopper 10. The discharge may be closed by suitable movable gates (not shown) similar to gates 6 which may be separately opened to open a desired portion of the hopper discharge. Between the hopper discharge and the conveyor 13, a hopper unloader 9 may be movably positioned, the function of which is the same as hereinbefore indicated.

Two major difficulties are encountered in unloading hoppers such as hoppers 3, 4 and 10 which are more or less acute, depending upon the nature of the materials 2 or 11. When predetermined gates 6, for instance, are opened it may be found that because of adherence of material to the sides of the hopper and because of coherence of the material, the material will not flow from the hopper to the conveyor, that is, the discharge becomes jammed. At another location along the hopper, when the gates are opened the material may flow freely through the discharge in a veritable avalanche. It can readily be seen that this condition is most undesirable since the conveyor will be underloaded in one case and will be virtually inundated in the other case. Briefly, control of the unloading of the hoppers and loading of the conveyors is most difficult.

Briefly described, my hopper unloader 9, as will be hereinafter more fully described, induces, controls and directs the flow of material from hoppers, such as described, whereby rapid unloading of the hopper takes place and efficient loading of the conveyor is secured.

Referring particularly to Figs. 4, 5, 6 and 7, the hopper unloader 9 is shown in detail. The device 9 comprises a frame which includes longitudinal beams 14 and cross beams 15. Extending downwardly from the beams 14 are vertical supporting beams 16 which at their lower portions carry longitudinal wheel-supporting beams 17. The wheel-supporting beams 17 carry a plurality of flanged wheels 18 which ride upon opposite rails 19. The rails 19 are disposed on each side of the conveyor 8 and are substantially coextensive with the elongated discharge 5 of the hopper 4.

The detailed description of the device 9 is given in conjunction with the hopper 4, but it is to be understood that the relationship of the unloader 9 to hoppers 3 and 10 would be identical with the relationship herein described in detail.

A pair of electric motors 20 are carried by the movable frame and each motor is adapted to drive one of the wheels 18 through a conventional gear reducer 21, also carried by said frame. A pulley or sprocket wheel 22 constitutes the output of each gear reducer 21 and a belt or sprocket chain 23 is trained around the pulley or sprocket wheel, said belt or chain being also trained around pulley or sprocket wheel 24 carried upon shaft 25 which carries a wheel 18. Thus, the frame and, hence, the entire device 9 may be moved along rails 19. If a more positive driving arrangement is desired, the rails 19 may be constructed in the form of racks and the wheels 18 may be made in the form of gears.

A ring casting 26 is supported upon the frame, hereinbefore described, at about its control portion, said ring having a plurality of stepwise arranged annular shoulders 27, 28 and 29. Upon annular shoulder 28 a lower bearing race 30 is positioned which supports roller bearings 31. A dome-shaped projecting member 32 is adapted to be rotatably carried upon bearings 31, said projecting member carrying an upper annular race 33 which rides upon the roller bearings. The lower portion of the projecting member 32 carries an outwardly extending annular flange 34 which at its lower side carries a ring gear 35. The upper side of the flange 34 supports a secondary lower bearing race 36 which is adapted to support secondary roller bearings 37, said bearings being positioned between said lower race 36 and an upper race 38 carried by an annular cover ring 39.

Thus, the dome-shaped projecting member 36 is rotatably supported upon the frame upon bearings 31, the bearings 37 functioning to rotatably support the annular ring 39.

An electric motor 40 is mounted upon the upper portion of the frame, hereinbefore described, said motor having a pulley 41 which is adapted to drive a plurality of transmission belts 42, the belts being trained around pulley 43 mounted upon input shaft 44 of a conventional gear reducer 45. The gear reducer has an output shaft 46 upon which an output pulley 47 is mounted. The pulley 47 drives a plurality of transmission belts 48 which in turn are trained around a pulley 49 carried upon drive shaft 50. The drive shaft 50 is journaled in a bearing 51 mounted upon the frame and at the end of said drive shaft a driving gear 52 is mounted. The gear 52 meshes with ring gear 35 hereinbefore described. It can readily be seen that when the motor 40 is energized said motor functions to drive the dome-shaped projecting member 32 by means of the driving relationship established between gear 52 and ring gear 35.

A lower bearing race 53 is mounted upon shoulder 29 of the ring casting 26, said lower race supporting a plurality of roller bearings 54. An annular casting 55, which is L-shaped in cross-section, carries an upper annular race 56 which is mounted upon the roller bearings 54. In this fashion the casting 55 is rotatable upon the ring casting 26. The annular casting 55 carries at its lower portion a ring gear 57 and a substantially cylindrical guide sleeve 58 is also mounted upon the casting 55, said guide sleeve extending downwardly from said casting.

A second motor 59 is mounted upon the upper portion of the frame, hereinbefore described, on the opposite side of the projecting member 32 from the motor 40. The motor 59 carries a drive pulley 60 which, in turn, drives a plurality of transmission belts 61. The belts 61 are trained around pulley 62 which comprises the input of a conventional gear reducer 63. The output shaft 64 of the gear reducer 63 carries a pulley 65 around which transmission belts 66 are trained, said belts also being trained around pulley 67 mounted upon an end portion of a drive shaft 68. The drive shaft 68 is journaled in bearings 69 which are mounted upon the main frame. At the end of the shaft 68 a driving gear 70 is mounted, said gear being adapted to mesh with ring gear 57. The arrangement is such that when motor 59 is energized, said motor drives the guide sleeve 58 in a rotary fashion.

The dome-shaped projecting member 32 is constructed in the form of a hollow substantially semi-spherical shell 71, said shell comprising a portion of the ring-like casting which is carried upon the roller bearings 31. As shown best in Fig. 5 the hemispherical shell is divided substantially into quadrants, two opposite quadrants comprising the solid portion of the shell and the two remaining opposite quadrants comprising openings in the shell. The solid portions of the shell being designated 72 and the open portions of the shell being designated 73 in Fig. 5.

In utilizing the device 9 the frame mounted upon the wheels 18 is moved upon rails 19 between the conveyor 8 and the elongated discharge of the hopper 4. The arrangement is such that the projecting member 32 carried by the movable frame extends or projects upwardly into the discharge 5 of the hopper, as shown best in Figs. 2 and 6. Of course, the projecting member 32 is permanently positioned in one portion of the discharge 5 when the hopper 4 is originally loaded, preferably at an end portion of said discharge. At this period, the remaining gates 6 of the elongated discharge are closed. When it is desired to unload the hopper 4 the motor 40 is actuated whereby the projecting member 32 is rotated. The rotation of the projecting member which extends into the body of the material 2 tends to agitate said material and cause said material to flow through the openings 73 in the shell and downwardly through the hollow shell and through the guide sleeve 58 to the upper pass of the conveyor 8. It can readily be seen that the rotary movement of the shell 32 in the lower portion of the body of the material 2 prevents said material from packing, bridging or jamming at the lower portion of the hopper and consequently the flow of material from the portion of the hopper where the projecting member is located is facilitated. The rate of rotation of the projecting member 32 tends to function as a control of the rate of passage of the material downwardly through the shell and onto the conveyor. As desired, after the projecting member has been rotated for a period of time, within one portion of the body of the material 2 the gates 6 adjacent the projecting member may be opened and the frame may be moved longitudinally along the rails 19 while the projecting member 32 is rotating. Thus, the adjacent material in the hopper will be conditioned to flow downwardly through the then opened portion of the discharge 5. This operation may be repeated throughout the entire length of the elongated discharge 5 until the hopper 4 is completely empty or until a desired portion of the contents of the hopper is removed.

To facilitate the agitating action of the projecting member 32 and to permit it to cut into the mass of material 2, the leading defining edges of the solid quadrants 72 may be tapered as indicated at 74 in Fig. 5. Also, to facilitate the rotary movement of the projecting member in the mass of material the trailing edges of the quadrants 72 may be relieved inwardly as indicated at 75 in Fig. 5. In addition, the radius of curvature of the solid portions 72 of the projecting member may be gradually reduced from each leading edge 74 to each trailing edge 75 as indicated at 76 in Fig. 5. By these expedients the projecting member 32 performs a more efficient cutting action within the mass of the material 2 during its rotation.

The present invention also contemplates a further means of controlling the rate of passage of the material 2 in the hopper to the belt. This control comprises the provision of a secondary substantially hemispherical segmented shell 77. The shell 77 may be journaled to the upper portion of the main shell 72 as at 78 in Fig. 7 whereby the secondary segmented shell 77 may be rotated relative to the main shell 71. The arrangement is such that when the secondary shell 77 is rotated relative to the main shell 71 the openings 73 may be changed depending upon the degree of rotation of the secondary shell 77. In other words, the secondary shell 77 functions as a valve for controlling the area of the openings 73. Of course, as the area of the openings 73 is decreased the rate of flow of material through said openings and through the projecting member to the conveyor belt is decreased and as said area is increased the rate of flow of the material to the conveyor belt is increased. Consequently, the use of the secondary shell 77 functions as an additional control upon the rate of passage of the material from the hopper to the conveyor.

The secondary shell 77 may be supported primarily upon a ring casting 79 which in turn may be rotatably positioned relative to the main shell 71. The ring casting 79 is tapered and carries upon its surface a frusto-conical lining 80 which is adapted to guide the material passing through the interior of the projecting member into the guide ring 58.

Referring particularly to Figs. 7 and 10, the ring casting 79 may be provided with a plurality of circumferentially spaced openings 81. A locking member 82 having a threaded shank 83 may be positioned in the base of the casting comprising the projecting member 32. An opening 84 may be provided in the main ring casting 26 whereby the locking pin 83 may be moved outwardly to disengage the end thereof from one of the openings 81. Thus, the secondary shell 77 may be moved to a desired position relative to the main shell 71 and the locking pin 83 may then be inserted into an appropriate opening 81 whereby to hold the secondary shell 77 and the main shell 71 relatively rigid.

To prevent the material being discharged through the projecting member 32 from packing or jamming adjacent the guide sleeve 58 said guide sleeve may be rotated by motor 59 through the means hereinbefore described. If desired, as an additional expedient for controlling the passage of the material through the shell and to the conveyor belt, annularly disposed deflection plates 85 may be mounted in circumferentially spaced relationship upon the inner face of the guide sleeve 58. By the provision of the angularly disposed deflection plates 85, the rate of passage of material through the guide sleeve may be accelerated or retarded by the rate of rotation of the sleeve 58. It can readily be seen that by relating the angular disposition of the deflection plates 85 to the direction of rotation of the guide sleeve 58, said deflecting plates may be cause to accelerate the movement of the material through the guide sleeve or if the angular disposition of the deflection plates is opposite, the rotation of the guide sleeve will cause said deflection plates to retard the movement of the material through the guide sleeve. It can be seen that the guide sleeve with the deflection plates mounted thereon, provides two means of controlling the rate of passage of the material, namely, the angular relationship of the disposition of the deflection plates relative to the rate of rotation of the guide sleeve and the rate of rotation of the guide sleeve itself.

Broadly, the present invention may contemplate a construction wherein the projecting member 32 rotates and the projecting member may or may not, as desired, carry a secondary control shell. In addition, if desired, the guide sleeve may be maintained stationary and may be employed without the angularly disposed deflection plates 85 or said guide sleeve may be rotated and the angularly disposed deflection plates may be employed. In addition, if the angular deflection plates are employed they may be so disposed relative to the rate of direction of the guide as to accelerate or retard the rate of movement of the material from the hopper to the conveyor.

Referring particularly to Fig. 8, one or more teeth or gouges 86 may be mounted upon the outer surface of the projecting member 32. By the provision of the teeth 86 the agitating action of the projecting member will be intensified.

If desired, as shown best in Fig. 9, adjustable teeth 87 may be mounted upon the outer surface of the projecting member, the adjustable teeth comprising extending members which may be journaled as at 88 upon brackets 89 which latter may be carried upon the outer face of the projecting member. A lug 90 may be carried upon each bracket 89 and an adjusting screw 91 may be threaded in each bracket 90, the end of said screw tending to move controlling the angular disposition of the teeth 87 during rotation of the projecting member in the direction indicated by the arrow 92.

Although the projecting member 32 is shown and described as being substantially hemispherical or dome-shaped, it is to be understood that said member may take any desired form or shape. In addition, the projecting member 32 is shown and described as having two openings or open portions 73, but, if desired, one or more openings or open portions are contemplated. Further, if desired, side plates 93 may be carried by the traveling frame, said plates being spaced from each other and extending downwardly to the upper pass of the conveyor. By the provision of the plates 93 the material loaded upon the belt will be prevented from spilling from the sides of the belt during the loading operation.

The device comprising the present invention may be employed, as desired, in a number of ways. For instance, the projecting member may be disposed at a predetermined position at the hopper discharge and rotated until the portion of the hopper immediately above the device is substantially completely emptied before the device is moved along the tracks to a new location, or the device may be moved forwardly and backwardly along the track to gradually and uniformly empty the hopper. Of course, other manners of use will be apparent to those skilled in the art. Further, from the present disclosure, many modifications of my invention will suggest themselves to those skilled in the art, and, hence, I do not wish to be limited except as necessitated by the appended claims.

I claim as my invention:

1. A hopper unloading apparatus comprising a frame adapted to be positioned beneath the exit opening of a material-carrying hopper, said frame being separate from said hopper, a hollow projecting member having an opening in its surface carried by said frame and adapted to extend upwardly through said hopper exit opening into said hopper and into the body of the material in the hopper, and means for rotating said projecting member in the body of the material to agitate the material and condition it for flow through the opening in said member and through said exit opening.

2. A hopper unloading apparatus comprising a frame adapted to be positioned beneath the exit opening of a material-carrying hopper, said frame being separate from said hopper, a hollow projecting member having a segmental shaped opening in its surface carried by said frame and adapted to extend upwardly through said hopper exit opening into said hopper and into the body of the material in the hopper, said hollow member being of a size to permit its movement into and out of said hopper exit at right angles to the plane of the exit, and means for rotating said projecting member in the body of the material to agitate the material and condition it for flow through the opening in said member and through said exit opening.

3. A hopper unloading apparatus comprising a frame adapted to be positioned between the exit opening of a material-carrying hopper and a movable conveyor positioned beneath said exit opening, said frame being separate from said hopper, a hollow agitating substantially hemispherical shell carried by said frame and adapted to extend upwardly through said hopper exit opening into said hopper and into the body of the material in the hopper, said shell having an annular open bottom and provided with a substantially segmental opening in its top portion, and means for rotating said shell in the body of the material to agitate the material and condition it for flow through said shell and through said exit opening in the hopper to said conveyor.

4. A hopper unloading apparatus comprising a frame adapted to be positioned between the exit opening of a material-carrying hopper and a movable conveyor positioned beneath said exit opening, said frame being separate from said hopper, a hollow agitating shell carried by said frame and adapted to extend upwardly through said hopper exit opening into the body of the material in the hopper, said shell having an open bottom and provided with an opening in its top portion, means for rotating said shell in the body of the material to agitate the material and condition it for flow through said shell and through said exit opening in the hopper to said conveyor, and adjustable means carried by said shell for controlling the size of the top opening in said shell for controlling the flow of material to said conveyor.

5. A hopper unloading apparatus comprising a frame adapted to be positioned between the exit opening of a material-carrying hopper and a movable conveyor positioned beneath said exit opening, said frame being separate from said hopper, a hollow agitating shell carried by said frame and adapted to extend upwardly through said hopper exit opening into said hopper and into the body of the material in the hopper, said shell having an open bottom and provided with an opening in its top portion, means for rotating said shell in the body of the material about a substantially vertical axis to agitate the material and condition it for flow through said shell top opening and through said exit opening in the hopper to said conveyor, and a guide sleeve carried by said frame beneath the open bottom of said shell and defining an area at its upper portion substantially coextensive with the opening in the bottom of said shell for guiding material downwardly from within said shell to said conveyor.

6. A hopper unloading apparatus comprising a frame adapted to be positioned between the exit opening of a material-carrying hopper and a movable conveyor positioned beneath said exit opening, a hollow agitating shell carried by said frame and adapted to extend upwardly through said hopper exit opening into the body of the material in the hopper, said shell having an open bottom and provided with an opening in its top portion, means for rotating said shell in the body of the material to agitate the material and condition it for flow through said shell and through said exit opening in the hopper to said conveyor, a guide sleeve carried by said frame beneath the open bottom of said shell and defining an area at its upper portion substantially coextensive with the opening in the bottom of said shell for guiding material downwardly from within said shell to said conveyor, and means carried by said frame for rotating said guide sleeve.

7. A hopper unloading apparatus comprising a frame adapted to be positioned between the exit opening of a material-carrying hopper and a movable conveyor positioned beneath said exit opening, a hollow agitating shell carried by said frame and adapted to extend upwardly through said hopper exit opening into the body of the material in the hopper, said shell having an open bottom and provided with an opening in its top portion, means for rotating said shell in the body of the material to agitate the material and condition it for flow through said shell and through said exit opening in the hopper to said conveyor, a guide sleeve carried by said frame beneath the open bottom of said shell and defining an area at its upper portion substantially coextensive with the opening in the bottom of said shell for guiding material downwardly from within said shell to said conveyor, means carried by said frame for rotating said guide sleeve, and an angularly disposed deflector carried by said guide sleeve and extending inwardly from said sleeve to control the rate of passage of material through said sleeve.

8. A hopper unloading apparatus comprising a frame adapted to be positioned beneath the exit opening of a material-carrying hopper, a projecting member carried by said frame and adapted to extend upwardly through said hopper exit opening into the body of the material in the hopper, and means carried by said frame for moving said projecting member in the body of the material to agitate the material and condition it for flow through said exit opening, a guide sleeve carried by said frame and positioned beneath said projecting member to guide material passing through said exit opening, an angularly disposed deflector carried by said guide sleeve and extending inwardly from said sleeve, and means carried by said frame for rotating said guide sleeve to control the rate of passage of material through said sleeve.

9. A hopper unloading apparatus comprising a frame adapted to be positioned beneath the exit opening of a material-carrying hopper, a dome-shaped hollow projecting member carried by said frame and adapted to extend upwardly through said hopper exit opening into the body of the material in the hopper, said dome-shaped member having an open bottom and having an opening in its upper portion, and means for rotating said dome-shaped projecting member in the body of the material to agitate the material and condition it for flow through said opening in said dome-shaped member and through said exit opening.

10. A hopper unloading apparatus comprising a frame adapted to be positioned beneath the exit opening of a material-carrying hopper a dome-shaped hollow projecting member carried by said frame and adapted to extend upwardly through said hopper exit opening into the body of the material in the hopper, said dome-shaped member having an open bottom and having an opening in its upper portion, means for rotating said dome-shaped projecting member in the body of the material to agitate the material and condition it for flow through said opening in said dome-shaped member and through said exit opening, and a secondary dome-shaped element rotatably positioned within said dome-shaped member for controlling the size of the opening in the upper portion of said dome-shaped projecting member.

11. A hopper unloading apparatus comprising a frame adapted to be positioned beneath the exit opening of a material-carrying hopper, a dome-shaped hollow projecting member carried by said frame and adapted to extend upwardly through said hopper exit opening into the body of the material in the hopper, said dome-shaped member having an open bottom and having an opening in its upper portion, means for rotating said dome-shaped projecting member in the body of the material to agitate the material and condition it for flow through said opening in said dome-shaped member and through said exit opening, a secondary dome-shaped element rotatably positioned within said dome-shaped member for controlling the size of the opening in the upper portion of said dome-shaped projecting member, and means for locking said dome-shaped element in a predetermined position with respect to said dome-shaped projecting member.

12. In combination an elongated hopper for holding material, said hopper being provided with an elongated discharge at its bottom, gates for said discharge to selectively open portions of said elongated discharge, a separate frame movably mounted beneath said hopper discharge, means for moving said frame lengthwise of said discharge, a projecting member carried by said frame of smaller transverse dimensions than the width of the hopper discharge and adapted to extend into an open portion of said discharge and into the body of the material in the hopper, and means carried by said frame for rotating said projecting member in the body of the material to agitate the material and condition it for flow through the open portion of said discharge.

13. In combination an elongated hopper for holding material, said hopper being provided with an elongated discharge at its bottom, gates carried by said hopper for said discharge to selectively open portions of said elongated discharge, a conveyor positioned beneath said discharge and movable lengthwise thereof, a separate frame positioned between said hopper discharge and said conveyor, means for moving said frame lengthwise of said hopper discharge, a hollow projecting member having an open bottom carried by said frame and adapted to extend into an open portion of said discharge into the hopper and into the body of the material in the hopper, said projecting member having an opening in its upper surface whereby communication is established through said opening and said open bottom to said conveyor, and means carried by said frame for rotating said projecting member in the body of the material in the hopper to agitate the material and condition it for flow through said communicating openings to said conveyor.

References Cited in the file of this patent

FOREIGN PATENTS

| | | |
|---|---|---|
| 500,497 | Germany | June 21, 1930 |
| 506,720 | Germany | Sept. 8, 1930 |
| 685,638 | France | Apr. 1, 1930 |
| 715,252 | Germany | Dec. 17, 1941 |